US007529081B2

(12) United States Patent
Harmon et al.

(10) Patent No.: US 7,529,081 B2
(45) Date of Patent: May 5, 2009

(54) ELECTRONIC DEVICE AND SLIDE MECHANISM

(75) Inventors: Roger W. Harmon, Crystal Lake, IL (US); Roger W. Ady, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 438 days.

(21) Appl. No.: 11/325,953

(22) Filed: Jan. 5, 2006

(65) Prior Publication Data
US 2007/0153452 A1 Jul. 5, 2007

(51) Int. Cl.
*H05K 7/00* (2006.01)
(52) U.S. Cl. .............................. 361/679.3; 361/679.26; 455/575.7
(58) Field of Classification Search ................. 361/679, 361/681; 455/575.4
See application file for complete search history.

(56) References Cited
U.S. PATENT DOCUMENTS 5,995,373 A 11/1999 Nagai
7,006,015 B2* 2/2006 England ...................... 341/22
7,065,635 B1* 6/2006 Sugumar et al. ............. 712/228
7,158,634 B2* 1/2007 Eromaki ................. 379/433.13
7,200,429 B2* 4/2007 Park et al. ................ 455/575.4
2002/0039074 A1 4/2002 England
2007/0032275 A1* 2/2007 Suzuki et al. ............. 455/575.3
2007/0135181 A1* 6/2007 Ohki et al. ................ 455/575.1

OTHER PUBLICATIONS http://www.gadshaanandesign.com/work_samples/20.html, Mar. 15, 2005, 1 page.

* cited by examiner

Primary Examiner—Jayprakash N Gandhi
Assistant Examiner—Ingrid Wright
(74) Attorney, Agent, or Firm—Gary J. Cunningham

(57) ABSTRACT

An electronic device (100), suitable for operation in a compact configuration, a portrait configuration, and a landscape configuration includes a first housing (102) and a second housing (104) coupled to the first housing. A data coupler (502) electronically couples the first housing with the second housing, and a bar linkage slides the first housing and the second housing in a non-linear motion with respect to each other.

18 Claims, 11 Drawing Sheets

LANDSCAPE
CONFIGURATION

ELECTRONIC DEVICE AND SLIDE MECHANISM

FIELD

The present disclosure relates in general to electronic devices, and more specifically to slide mechanisms in the electronic devices.

BACKGROUND

Due to the growth in modern communication technology, a large number of electronic devices such as mobile phones, pagers, cameras, MP3 players, remote controllers, personal digital assistants (PDAs), and the like, have been introduced in the market. In order to keep up with this trend and to gain a competitive advantage, manufacturers of electronic devices focus on enhancing the functionalities of the electronic devices, and at the same time making them compact. However, the small size of the electronic devices reduces the area available for their components such as keys and displays. To counter this restriction due to the reduced area, electronic devices with multiple housings have been developed. Such electronic devices can be folded or made compact in other ways when they are not in use, and are capable of performing different operations in different configurations.

Some foldable electronic devices have two or more housings. However, electronic devices with multiple housings suffer from one or more of the following limitations. First, the multiple housings increase the weight of the electronic device. Second, multiple housings increase the thickness of the electronic device. Third, while typing text in alphanumeric characters, the electronic device needs to be switched to different configurations to alternatively enter characters from a telephonic keypad or a QWERTY keypad. Fourth, the multiple housings can be made compact or made to slide in one direction only—either along their length or their breadth.

SUMMARY

An electronic device that includes a plurality of housings that slide with respect to each other in a non-linear motion is described.

BRIEF DESCRIPTION OF THE DRAWINGS

The present disclosure is illustrated by way of example and not limitation in the accompanying figures, in which like references indicate similar elements, and in which.

Figure 1:
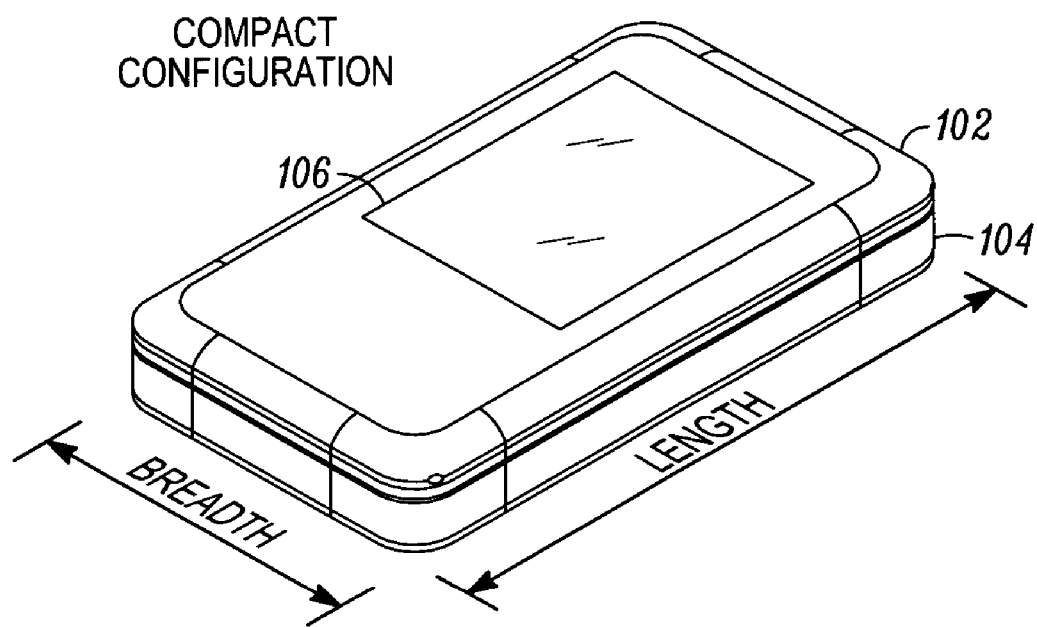
FIG. 1 shows a view of an exemplary electronic device in a compact configuration, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE EMBODIMENTS

Before describing in detail the particular electronic device in accordance with the present disclosure, it should be observed that the present disclosure resides primarily in combinations of method steps and apparatus components related to the electronic device. Accordingly, the apparatus components and method steps have been represented where appropriate by conventional symbols in the drawings, showing only those specific details that are pertinent to understanding the present disclosure so as not to obscure the disclosure with details that will be readily apparent to those of ordinary skill in the art having the benefit of the description herein.

In this document, relational terms such as "first", "second", and the like may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" and the like does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically.

FIG. 1 shows a view of an exemplary electronic device 100, in accordance with an embodiment of the present disclosure. In accordance with the embodiment, the electronic device 100 is shown in a compact configuration. The electronic device 100 can also have other configurations, such as a landscape configuration and a portrait configuration. Examples of the electronic device 100 include devices such as mobile phones, pagers, cameras, MP3 players, personal digital assistants (PDAs), and the like. The electronic device 100 includes a first housing 102 and a second housing 104. The first housing 102 includes a display unit 106 and can also include external keys. The external keys can be navigational keys and soft keys, although they may be easily substituted by other keys such as power on-off, volume up-down, display on-off, and display contrast up-down. Further, external keys may be implemented virtually by using a touch screen, a touchpad, a joystick or other input mechanisms.

In the compact configuration, the first housing 102 and the second housing 104 are aligned with each other. A length of the first housing 102 is aligned with the length of the second housing 104, and a breadth of the first housing 102 is aligned with the breadth of the second housing 104. The portrait configuration and the landscape configuration are defined, based on the relative positions of the first housing 102 and the second housing 104 with respect to each other. The electronic device 100 further includes an internal keypad (not shown in FIG. 1) on the second housing 104. In accordance with an embodiment, the compact configuration, the portrait configuration, and the landscape configuration have an effect on the usability of the internal keypad. The internal keypad includes a first portion referred to as a numeric keypad, and a second portion referred to as a QWERTY keypad. In accordance with an embodiment, the internal keypad can be the QWERTY keypad and need not include a separate set of keys apart from those present in the QWERTY keypad. In such a case, the numeric keypad is part of the QWERTY keypad.

Figure 2:
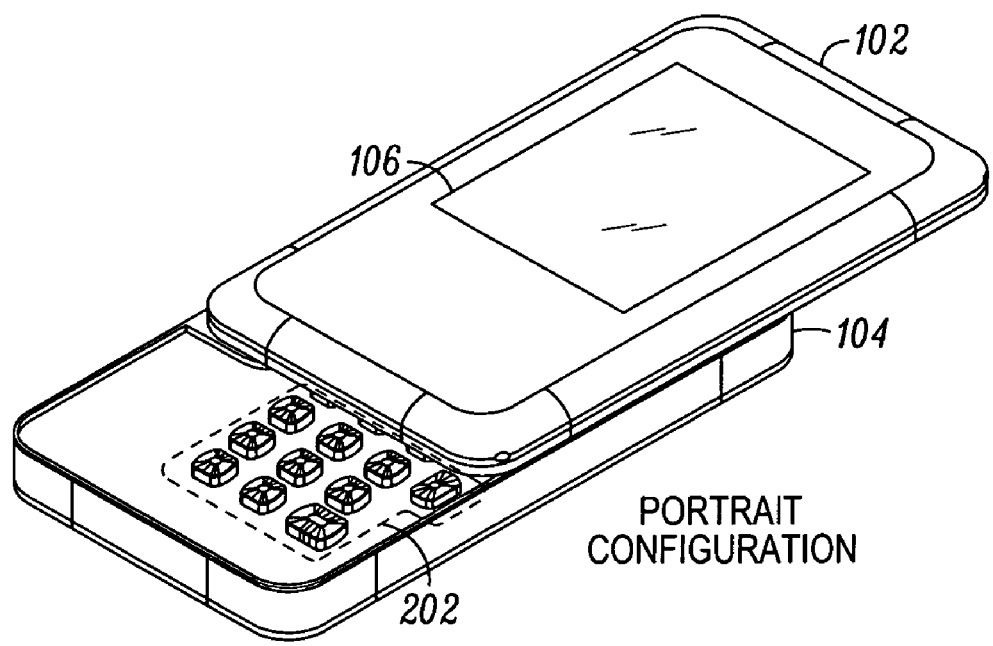
FIG. 2 shows a view of the electronic device of FIG. 1 in a portrait configuration, in accordance with an embodiment.

FIG. 2 shows a view of the electronic device 100 in the portrait configuration, in accordance with an embodiment of the present disclosure. In the portrait configuration, the first housing 102 is offset in a first direction with respect to the second housing 104, to expose the numeric keypad 202. Therefore, in the portrait configuration, the numeric keypad 202 can be used. In accordance with an embodiment, the first housing 102 is offset along the length of the second housing 104, to present a length-wise augmented profile of the electronic device 100 as shown in FIG. 2.

Figure 3:
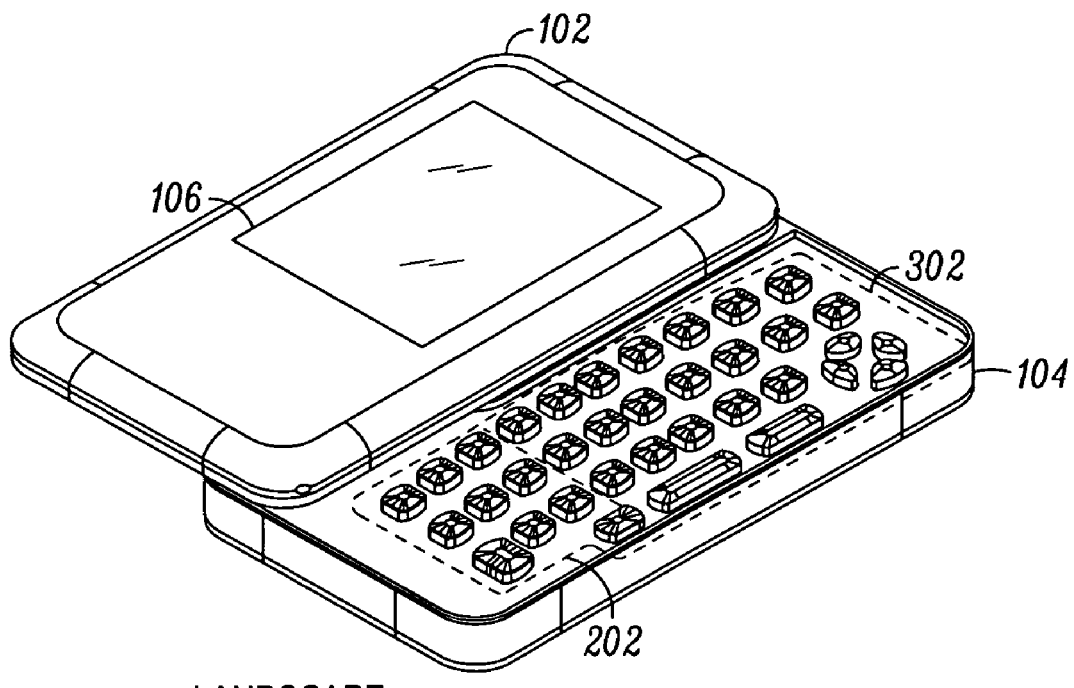
FIG. 3 shows a view of the electronic device of FIG. 1 in a landscape configuration, in accordance with an embodiment.

FIG. 3 shows a view of the electronic device 100 in the landscape configuration, in accordance with an embodiment of the present disclosure. In the landscape configuration, the first housing 102 is offset in a second direction with respect to the second housing 104, to expose the QWERTY keypad 302. Therefore, in the landscape configuration, the QWERTY keypad 302 can be used. In accordance with an embodiment, the first housing 102 is offset along the breadth of the second housing 104, to present a breadth-wise augmented profile of the electronic device 100.

The electronic device 100 is suitable for operation in the compact configuration, the portrait configuration, and the landscape configuration. The portrait configuration and the landscape configuration are defined, based on the relative positions of the first housing 102 and the second housing 104 with respect to each other, as described earlier. A bar linkage is used in order to effect changes between the compact configuration, the portrait configuration, and the landscape configuration.

Figure 4:
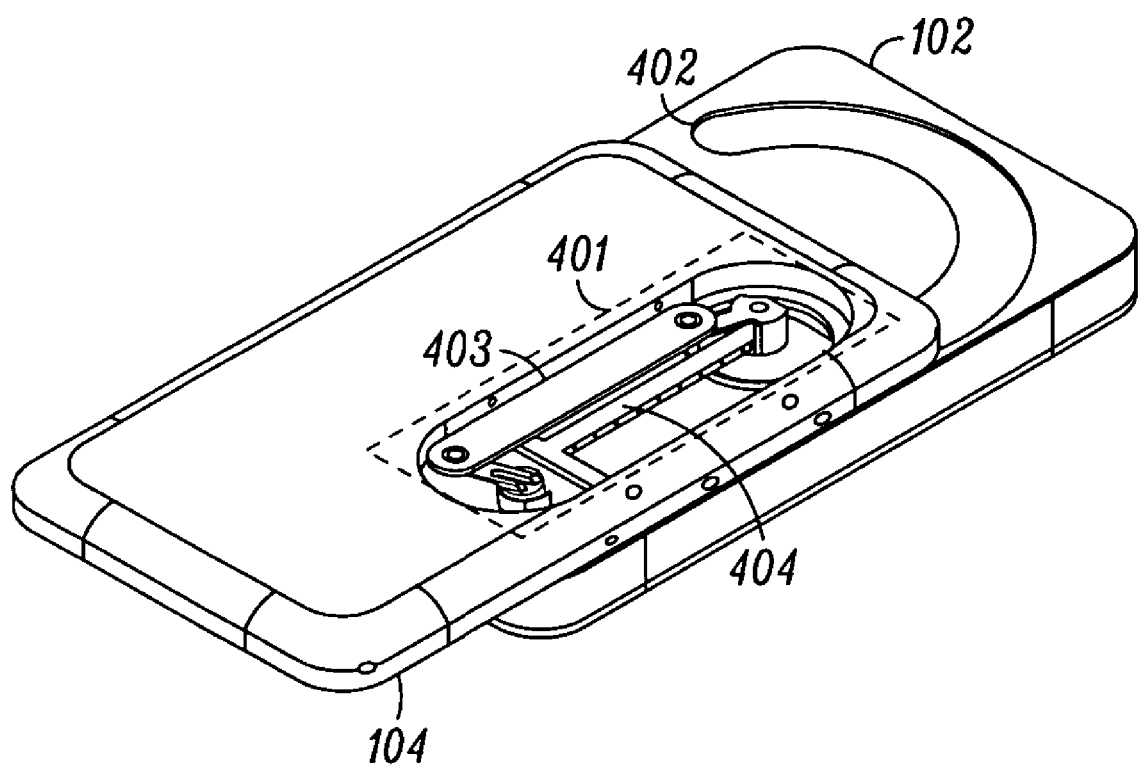
FIG. 4 shows a bar linkage in the electronic device of FIG. 1, in accordance with an embodiment.

FIG. 4 shows the bar linkage in the electronic device 100, in accordance with an embodiment of the present disclosure. Examples of the bar linkage, which is a slidable non-linear mechanism, include, but are not limited to, a three-bar linkage and a four-bar linkage 401. In accordance with the embodiment, the four-bar linkage 401 slides the first housing 102 with respect to the second housing 104 in a non-linear motion, to configure the compact configuration, the portrait configuration or the landscape configuration. To slide the first housing 102 with respect to the second housing 104, a curved track 402 is provided in the first housing 102. The curved track 402 allows a two-dimensional movement of the four-bar linkage 401 in the curved track 402, and restricts a three-dimensional movement of the four-bar linkage 401. In this view, a first bar 403 and a second bar 404 of the four-bar linkage 401 are shown. The second bar 404 will be functionally described in conjunction with FIG. 5.

Figure 5:
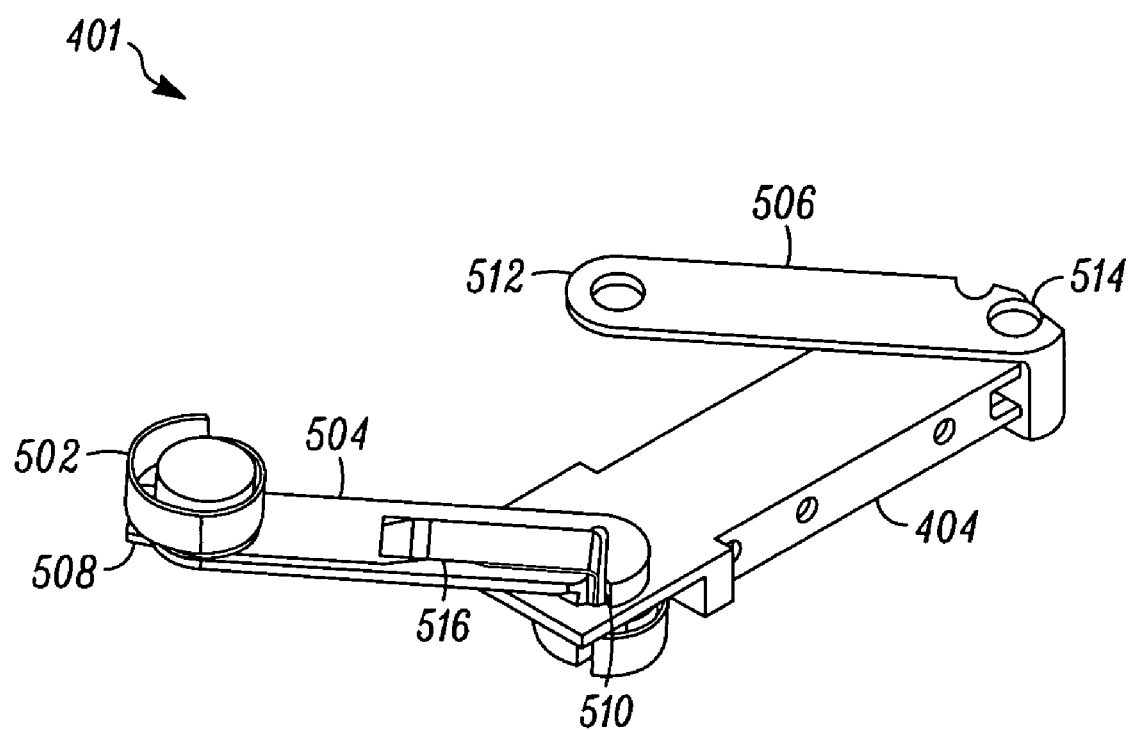
FIG. 5 shows a view of the bar linkage of FIG. 4, in accordance with an embodiment.

FIG. 5 shows a view of the four-bar linkage 401, in accordance with an embodiment of the present disclosure. In this embodiment, the slidable non-linear mechanism also includes a data coupler 502. The data coupler 502 electronically couples the first housing 102 with the second housing 104. In accordance with an embodiment of the present disclosure, the data coupler 502 is a flexible circuit that can couple the first housing 102 with the second housing 104 even when they are offset with respect to each other to form the portrait configuration and the landscape configuration from the compact configuration. Examples of the data coupler 502 include, but are not limited to, flexible circuits and optical couplers.

The four-bar linkage 401 includes the first bar 403 (not shown in FIG. 5), the second bar 404, a third bar 504, and a fourth bar 506. The first bar 403 is attached to the first housing 102, while the second bar 404 is attached to the second housing 104. The third bar 504 and the fourth bar 506 are coupled to the first bar 403 and the second bar 404, so that the first bar 403 and the second bar 404 remain substantially parallel during the movement of the first bar 403 and the second bar 404. The third bar 504 has a first end 508 and a second end 510. Similarly, the fourth bar 506 has a first end 512 and a second end 514. In an embodiment of the present disclosure, the first housing 102 is prevented from moving into a perpendicular position with respect to the second housing 104 by the fourth bar 506. Examples of the four-bar linkage 401 constructions include, but are not restricted to, a stacked plate type and a rod and bushing type.

In accordance with another embodiment of the present disclosure, the fourth bar 506 can be removed from the four-bar linkage 401 to form the three-bar linkage. The three-bar linkage enables the movement of the first housing 102 into an essentially perpendicular position in the second housing 104. This can be useful where a configuration of the first housing 102 forming a "T"-shape with the second housing 104 is desirable, such as when the electronic device 100 is used as a video player or in camera mode, to facilitate viewing of landscape pictures or any similar use.

In accordance with an embodiment of the present disclosure, at least one of the third bar 504 and the fourth bar 506 include a data coupler path 516 to route the data coupler 502 through it. The data coupler 502 electronically couples the first housing 102 with the second housing 104 by being routed through the data coupler path 516. The data coupler path 516 is further described in conjunction with FIG. 9.

Figure 6:
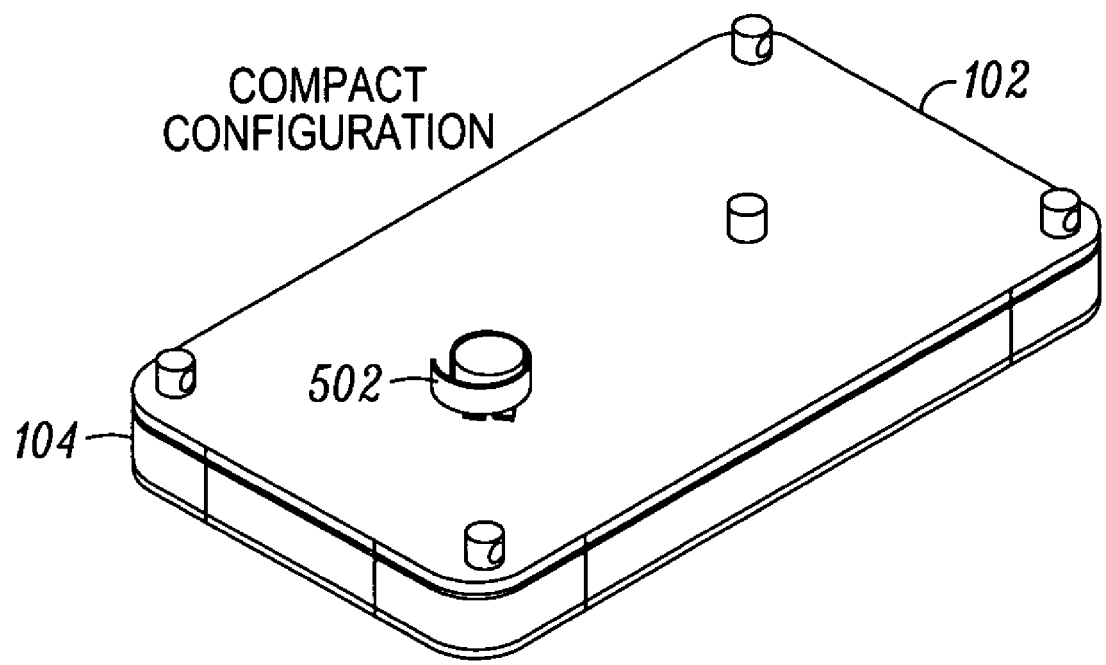
FIG. 6 shows a view of the electronic device of FIG. 1 in the compact configuration, with respect to the bar linkage of FIGS. 4 and 5, in accordance with the embodiments.

FIG. 6 shows a view of the electronic device 100 in the compact configuration, with respect to the bar linkage of FIGS. 4 and 5, in accordance with an embodiment of the present disclosure. In the compact configuration, the first housing 102 and the second housing 104 are aligned with each other.

Figure 7:
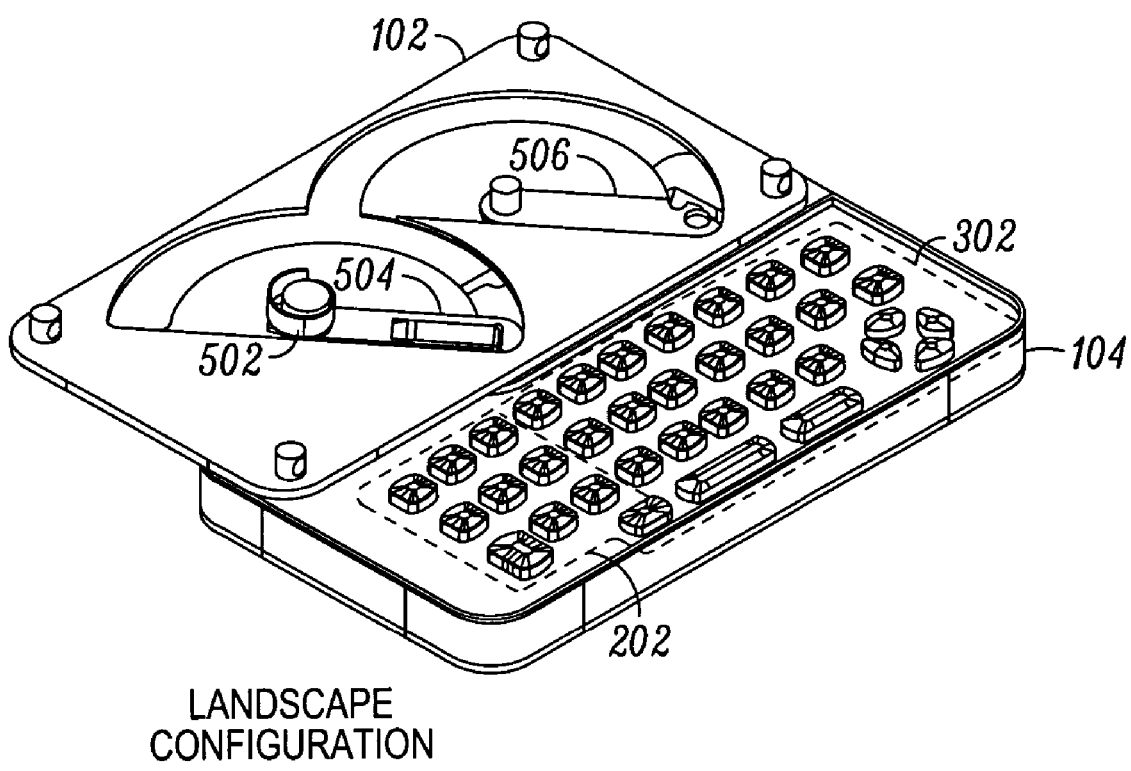
FIG. 7 shows a view of the electronic device of FIG. 1 in the landscape configuration, with respect to the bar linkage of FIGS. 4 and 5, in accordance with the embodiments.

FIG. 7 shows a view of the electronic device 100 in the landscape configuration, with respect to the bar linkage of FIGS. 4 and 5, in accordance with an embodiment of the present disclosure. In the landscape configuration, the first housing 102 and the second housing 104 are offset with respect to each other along the breadth, relative to the compact configuration, but remain aligned with each other along the length. The landscape configuration reveals the QWERTY keypad 302 on the second housing 104. The electronic device 100 is operated in the landscape configuration by using the external keys, if there are any, and the QWERTY keypad 302.

Figure 8:
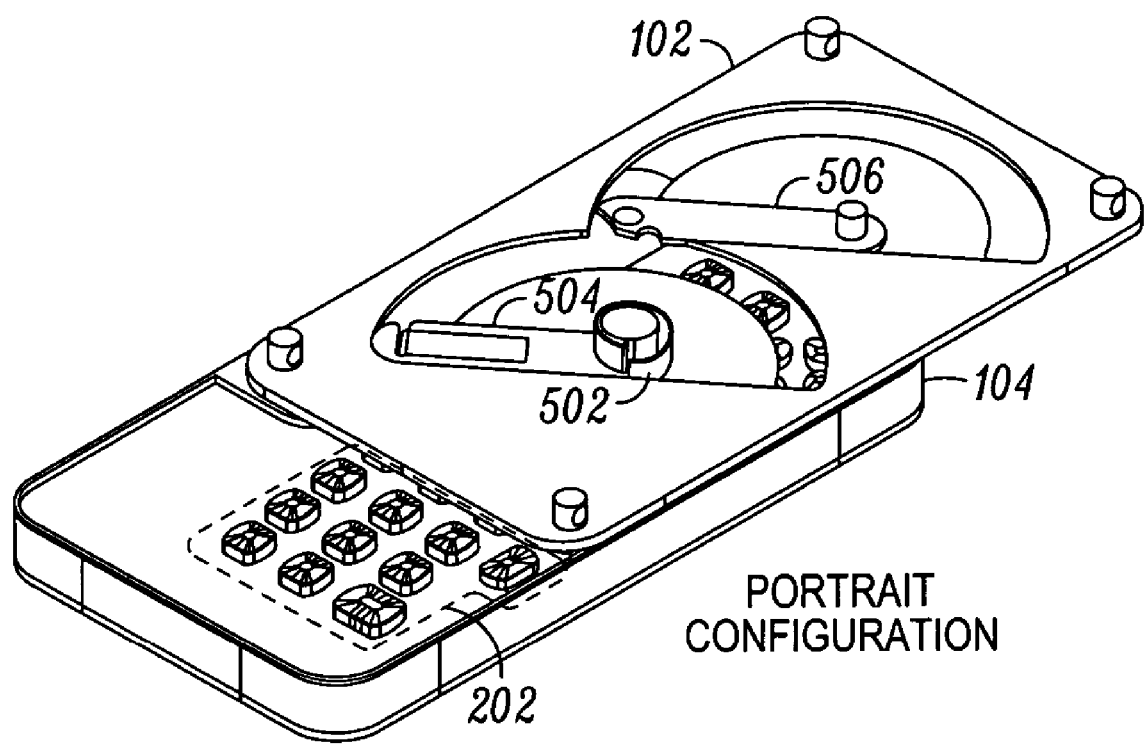
FIG. 8 shows a view of the electronic device of FIG. 1 in the portrait configuration, with respect to the bar linkage of FIGS. 4 and 5, in accordance with the embodiments.

FIG. 8 shows a view of the electronic device of FIG. 1 in the portrait configuration, with respect to the bar linkage of FIGS. 4 and 5, in accordance with an embodiment of the present disclosure. In the portrait configuration, the first housing 102 and the second housing 104 are offset with respect to each other along the length, relative to the compact configuration, but remain aligned with each other along the breadth. The portrait configuration reveals the numeric keypad 202 on the second housing 104. The electronic device 100 is operated in the portrait configuration by using the external keys, if there are any, and the numeric keypad 202.

In accordance with an embodiment of the present disclosure, when the electronic device 100 is a mobile phone, the portrait configuration is suitable for operating it in a talk mode. In the talk mode, it is desirable to have a greater length of the electronic device 100 facilitating the placement of a speaker in the mobile phone near the ear of a user, while bringing a microphone close to the mouth of the user. Further, access to the numeric keypad 202 can be useful to enable input or selection of numbers to be called. Alternatively, the landscape configuration is suitable for operating the electronic device 100 in a PDA mode. In the PDA mode, it is desirable to have a greater breadth of the electronic device 100, to facilitate ease of access to all the keys of the QWERTY keypad 302, which is more conveniently used for the input of text messages such as notes or email, as compared to the internal keypad 202.

In the compact configuration, the portrait configuration and the landscape configuration, exchange of electrical signals between the first housing 102 and the second housing 104 is required, such as between the display unit 106 and the keypads. The data coupler 502 that is routed through the data coupler path 516 carries these electrical signals between the first housing 102 and the second housing 104.

Figure 9:
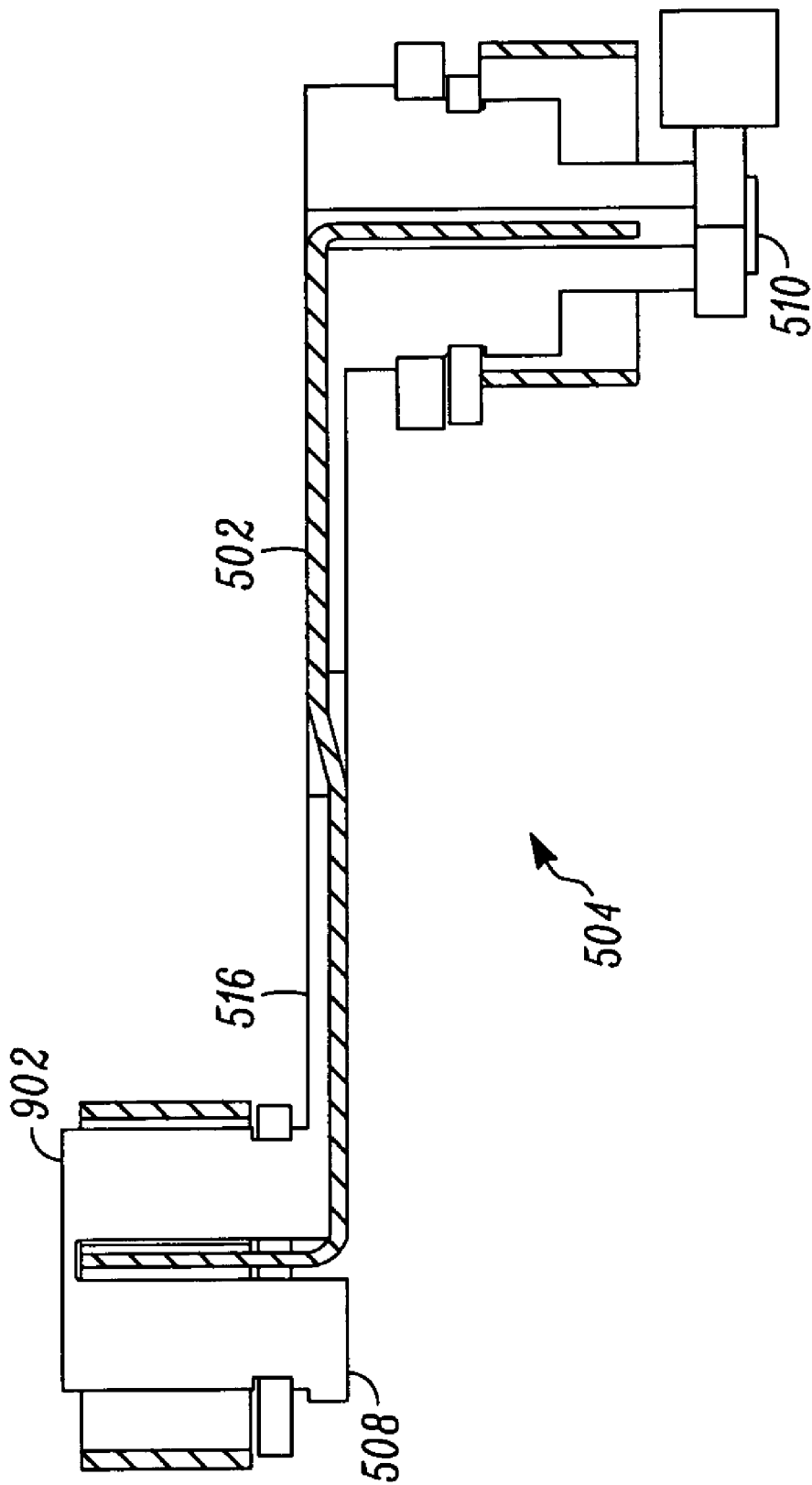
FIG. 9 shows a section view of a data coupler path, in accordance with an embodiment.

FIG. 9 shows a section view of the data coupler path 516, in accordance with an embodiment. In the section view of the data coupler path 516, the data coupler 502 is shown in bold, and depicts the routing of the data coupler 502 around a pin 902. The data coupler 502 can be held in place in the data coupler path 516 by means of a metal clip, or an adhesive, for example, but not limited to, epoxy or other forms of potting material. The pin 902 can protrude from the first end 508 of the third bar 504, the second end 510 of the third bar 504, the first end 512 of the fourth bar 506 or the second end 514 of the fourth bar 506. For example, in conjunction with FIGS. 5 and 6, the pin 902 is a protrusion from the first end 508 of the third bar 504. The pin 902 moves in the curved track 402 in the first housing 102. This restricts the three-dimensional or z-axis movement of the four-bar linkage 401. The curved track 402 acts as a clearance cut for the pin 902.

In accordance with an embodiment of the present disclosure, the third bar 504 includes the data coupler path 516 and multiple pins, for example, two pins, including the pin 902. The fourth bar 506 includes a pin and a hole. The fourth bar 506 can also include two pins, but including only one pin and the hole instead of the second pin reduces the thickness of the electronic device 100. This is because the pin of the fourth bar 506 can be placed in the first housing 102.

During the operation of the electronic device 100, the data coupler 502 in the data coupler path 516 can be subjected to a force that tends to displace the data coupler 502 from the data coupler path 516. For example, when changing between the compact configuration and the portrait configuration or the landscape configuration of the electronic device 100, the data coupler 502 can experience such a force.

Figure 10:
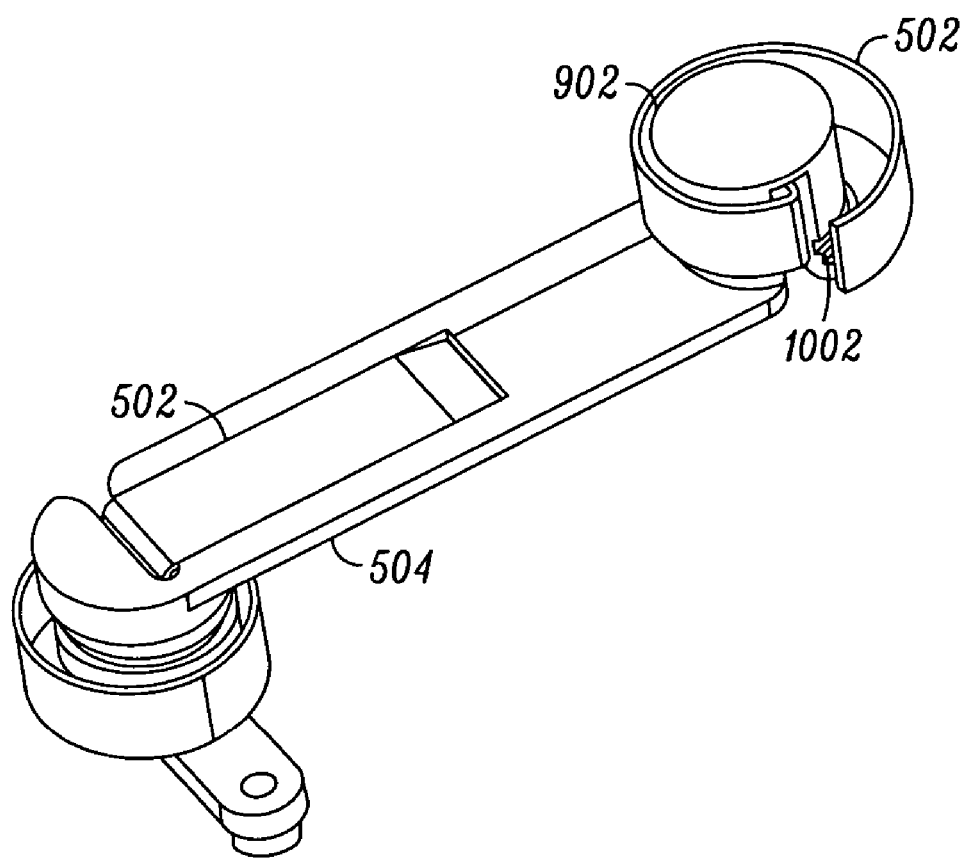
FIG. 10 shows a view of a third bar of the bar linkage of FIGS. 4 and 5, illustrating the bar linkage being held in place by a snap ring, in accordance with an embodiment.

FIG. 10 shows a view of the third bar 504 of FIG. 4, illustrating the bar linkage being held in place by a snap ring 1002, in accordance with an embodiment. The pin 902 can be held in place, and movement of the pin 902 can be restricted. The snap ring 1002 is used to anchor the joint at which the pin 902 is placed on the bar linkage, and holds the bar linkage in place, restricting the degree of freedom of the pin 902. The data coupler 502 extends and retracts around the pin 902, to enable changing between the compact configuration, the portrait configuration, and the landscape configuration. To hold the electronic device 100 in the compact configuration, the portrait configuration or the landscape configuration, a cam mechanism can be used.

Figure 11:
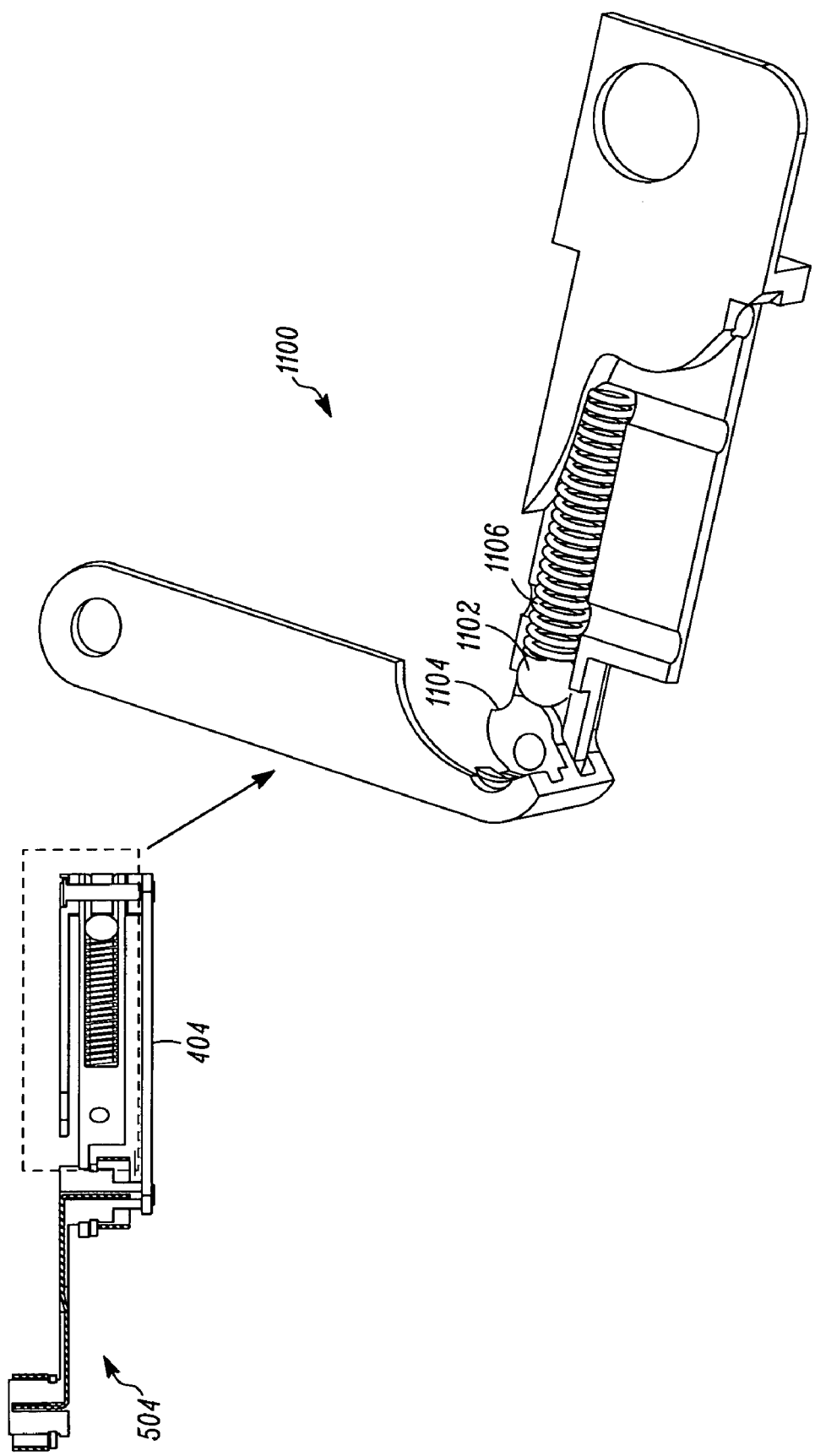
FIG. 11 shows a view of a cam mechanism that holds the electronic device of FIG. 1 in the compact configuration, the portrait configuration, and the landscape configuration, in accordance with an embodiment.

FIG. 11 shows a view of a cam mechanism 1100 that can hold the electronic device 100 of FIG. 1 in the compact configuration, the portrait configuration or the landscape configuration, in accordance with an embodiment. FIG. 11 shows the connection between the third bar 504 and the second bar 404. The cam mechanism 1100 resides, for example, in the second bar 404. An exploded view of the cam mechanism 1100 is shown in FIG. 11. In accordance with an embodiment of the present disclosure, the cam mechanism 1100 includes a ball and socket type joint, in which a ball 1102 is selectively inserted into a socket 1104 by a spring 1106. This holds the relative positioning of the bar linkages at the position of insertion of the ball 1102, which can be pushed into the socket 1104 by the spring 1106. The first housing 102 is therefore held in place relative to the second housing 104 as the bar linkages are coupled to them. Multiple sockets 604 can be used to define the relative positioning of the first housing 102 and the second housing 104 in the different configurations in which the electronic device 100 can be held. Examples of the different configurations include, but are not restricted to, the compact configuration, the portrait configuration, and the landscape configuration. The cam mechanism 1100 can also allow the first housing 102 to be held in an intermediate configuration with respect to the second housing 104, depending on a desired functionality. For example, the electronic device may be operated in a camera mode, exposing a viewfinder and flash in the landscape configuration, while exposing only the viewfinder in an intermediate configuration. This can be useful, for example, when flash functionality is not desired.

Various embodiments of the present disclosure, as described above, provide an electronic device that is suitable for operation in the compact configuration, the portrait configuration, and the landscape configuration. The use of the bar linkage can allow a reduction in the thickness of the electronic device by requiring only two housings, to allow for the configurations described earlier. The use of the bar linkage can also reduce the weight of the electronic device by removing the need for more than two housings, to allow for two degrees of freedom—along the length and the breadth. Further, the availability of the QWERTY keypad 302, when using the electronic device for text input, and the numeric keypad 202 when using it for numeric input, can make the electronic device more user-friendly.

It will be appreciated the electronic device described herein may include of one or more conventional processors and unique stored program instructions that control the one or more processors to implement, in conjunction with certain non-processor circuits, some of the functions of the electronic device described herein. The non-processor circuits may include, but are not limited to, a radio receiver, a radio transmitter, signal drivers, clock circuits, power source circuits, and user input devices.

It is expected that one of ordinary skill, notwithstanding possibly significant effort and many design choices motivated by, for example, available time, current technology, and economic considerations, when guided by the concepts and principles disclosed herein will be readily capable of manufacturing a device in accordance with the description as set out above.

In the foregoing specification, the disclosure and its benefits and advantages have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device comprising:
 a first housing;
 a second housing coupled to the first housing through a slidable non-linear mechanism, the slidable non-linear mechanism comprising:
  a data coupler that electronically couples the first housing with the second housing; and
  a bar linkage that slides the first housing and the second housing in a non-linear motion with respect to each other, wherein the bar linkage is a four-bar linkage, the four-bar linkage comprising: a first bar attached to the first housing; a second bar attached to the second housing; a third bar and a fourth bar, coupled to the first bar and the second bar such that the first bar and the second bar remain substantially parallel during movement of the first bar and the second bar.

2. The electronic device according to claim 1, wherein at least one of the third bar and the fourth bar comprises:
 a data coupler path for routing the data coupler through the at least one of the third bar and the fourth bar.

3. The electronic device according to claim 2, wherein the slidable non-linear mechanism further comprises:
 at least one pin, the at least one pin being a protrusion from at least one of a first end of the third bar, a second end of the third bar, a first end of the fourth bar, and a second end of the fourth bar; and
 a curved track on the first housing for the non-linear motion of the first housing with respect to the second housing by moving the pin in the curved track.

4. The electronic device according to claim 1, wherein the data coupler is a flexible circuit.

5. The electronic device according to claim 4, further comprising a snap ring, the snap ring holding the bar linkage in place.

6. The electronic device according to claim 1, further comprising a cam mechanism for holding the electronic device in at least one of a compact configuration, a portrait configuration, and a landscape configuration.

7. The electronic device according to claim 6, wherein the first housing and the second housing are aligned with each other in the compact configuration, a length of the first housing being aligned with a length of the second housing and a breadth of the first housing being aligned with a breadth of the second housing.

8. The electronic device according to claim 6, wherein the first housing is offset in a first direction with respect to the second housing to expose a numeric keypad in the portrait configuration.

9. The electronic device according to claim 6, wherein the first housing is offset in a second direction with respect to the second housing to expose a QWERTY keypad in the landscape configuration.

10. The electronic device according to claim 1, wherein the data coupler is an optical coupler.

11. The electronic device according to claim 1, wherein the bar linkage is of a stacked plate type.

12. An electronic device comprising:
 a first housing comprising a display; and
 a second housing comprising a keypad, wherein the second housing is operatively coupled to the first slidable non-linear mechanism that slides the first housing with respect to the second housing to expose a first portion of the keypad in a portrait configuration, and a second portion of the keypad in a landscape configuration, wherein the slidable non-linear mechanism comprises: a first bar attached to the first housing; a second bar attached to the second housing; a third bar rotatably coupling a first end of the first bar and a first end of the second bar; and a fourth bar rotatably coupling a second end of the first bar and a second end of the second bar.

13. The electronic device according to claim 12, further comprising:
 a data coupler for routing data between the first housing and the second housing.

14. The electronic device according to claim 13, further comprising:
 a data coupler path for holding the data coupler between the first housing and the second housing.

15. The electronic device according to claim 13, further comprising a snap ring, the snap ring holding the bar linkage in place.

16. The electronic device according to claim 13, wherein the data coupler is at least one of a flexible circuit and an optical coupler.

17. The electronic device according to claim 12, further comprising:
 a cam mechanism for holding the electronic device in at least one of a compact configuration, the portrait configuration and the landscape configuration.

18. The electronic device according to claim 12, wherein the slidable non-linear mechanism further comprises:
 at least one pin, the at least one pin being a protrusion from at least one of the first end of the third bar, the second end of the third bar, the first end of the fourth bar, the second end of the fourth bar, and the second housing; and
 a curved track on the first housing for the non-linear motion of the first housing with respect to the second housing by moving the pin in the curved track.

* * * * *